July 17, 1962    A. COX ETAL    3,044,356
ZOOM LENS
Filed May 26, 1961

Inventors:
Arthur Cox
Walter J. Johnson
By Robert F. Michler Atty.

United States Patent Office 3,044,356
Patented July 17, 1962

3,044,356
ZOOM LENS
Arthur Cox, Park Ridge, and Walter J. Johnson, Mundelein, Ill., assignors to Bell & Howell Company, Chicago, Ill., a corporation of Illinois
Filed May 26, 1961, Ser. No. 112,840
1 Claim. (Cl. 88—57)

This invention relates to a zoom lens and more particularly to a zoom lens highly corrected over a large range of magnification.

An object of the invention is to provide a zoom lens highly corrected over a large range of magnification.

Another object of the invention is to provide an inexpensive zoom lens highly corrected over a magnification range of at least two to one.

It is to be understood that the terms "front" and "rear" as herein used refer to the ends of the objective respectively nearer the long and short conjugates thereof.

Figure 1:
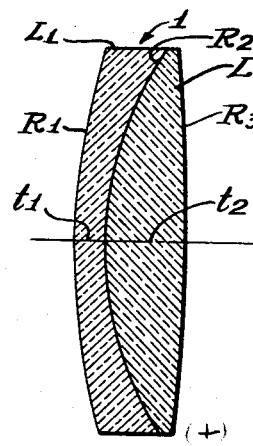
Figure 1:
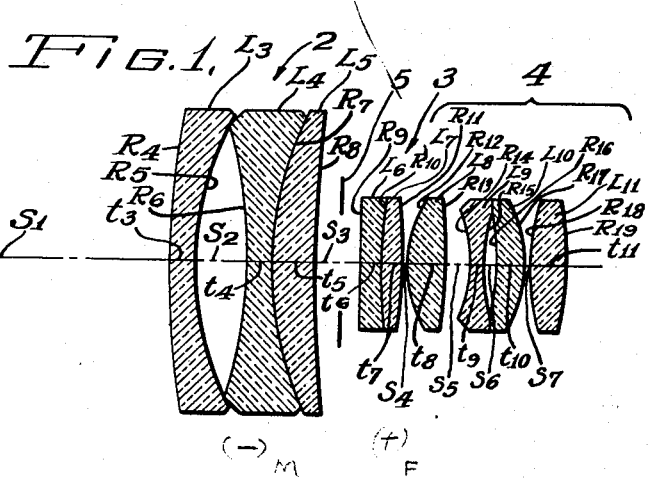
Figure 2:
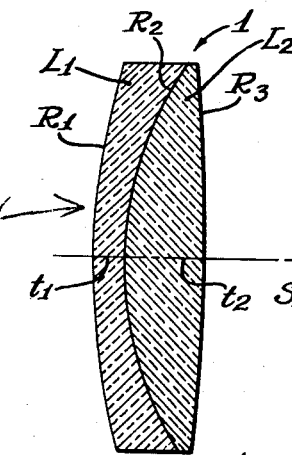
Figure 2:
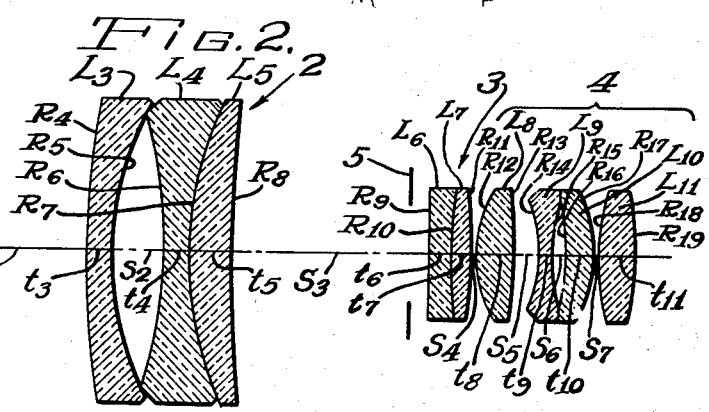
Figure 3:
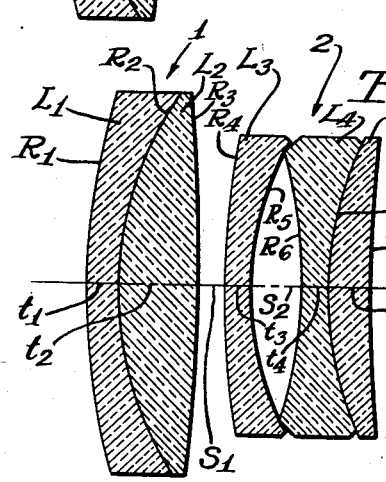
Figure 3:
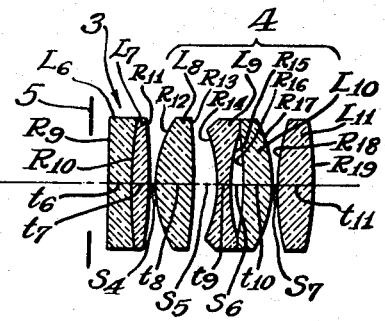

In the accompanying drawing forming a part hereof, FIGS. 1 to 3 illustrate a zoom lens described herein and embodying the invention, and respectively show the zoom lens in the long, median or intermediate, and short variable equivalent focal length adjustments thereof.

The invention provides a zoom lens or variable equivalent focal length objective having a front positive member, an intermediate negative member and a rear positive member. The front positive member is movable non-linearly during zooming and preferably is adjustable for focusing also. The intermediate negative member is movable linearly for zooming, and the rear member is fixed. Preferably, the front member includes a front positive doublet, the intermediate negative member has a front negative meniscus singlet and a biconcave rear doublet, and the rear member comprises a rear prime lens group and a front singlet just behind a stop.

Referring now in detail to the drawings, the zoom lens shown therein includes a front lens member 1 (FIGS. 1 to 3), an intermediate zoom lens member 2 and a rear lens member made up of a component or member 3 and a prime lens or member 4 with a stop 5 positioned between the members 2 and 3. The members 3 and 4 are stationary or fixed, and, during zooming, the member 1 is moved for focus compensation non-linearly relative thereto, first moving to the left from its extreme telephoto position shown in FIG. 1 until it reaches the position thereof shown in FIG. 2, which is the intermediate zooming position of unit magnification, and then moves to the right to its extreme wide angle position as shown in FIG. 3. The member 1 also is adjustable relative to the members 2, 3 and 4 for focusing for different object distances, and any focus of the zoom lens for any setting of the member 1 is correct for all zooming positions. During zooming, the member 2 is movable linearly relative to the member 1 from its extreme telephoto position of FIG. 1 to its extreme wide angle position of FIG. 3. A suitable lens mounting and zooming structure for the objectives disclosed herein is disclosed and claimed in copending application Serial No. 854,732 filed November 23, 1959, by F. W. Mellberg and assigned to the common assignee.

The front member 1 comprises a front biconvex, cemented doublet $L_1$—$L_2$ and having a dispersive internal contact surface $R_2$. The mean refractive index of the lens $L_1$ exceeds that of the lens $L_2$. The linearly movable negative zooming member 2 comprises a front negative meniscus singlet $L_3$ convex forwardly and a rear biconcave, cemented doublet component $L_4$—$L_5$ predominantly concave forwardly. The stationary member 3 is a positive doublet $L_6$—$L_7$ predominantly convex rearwardly, and forms a substantially afocal lens system with the members 1 and 2, it being possible to use this afocal system as an attachment or built in with the prime lens member 4 or with other prime lenses. The prime lens member 4 includes a front positive singlet $L_8$ predominantly convex forwardly, a biconcave singlet $L_9$ predominantly concave forwardly, a positive meniscus singlet $L_{10}$ concave forwardly and a rear biconvex singlet $L_{11}$. The lenses $L_1$ to $L_{11}$ have spherical surfaces or radii of curvature $R_1$ to $R_{19}$, axial thicknesses $t_1$ to $t_{11}$ and axial separations $s_1$ to $s_7$.

The equivalent focal length of each of the lenses of FIGS. 1 to 3 is variable over at least a two to one range of magnification while maintaining a high degree of optical correction for a large aperture of at least $f/1.9$ throughout the range. Spherical aberration, coma, astigmatism, field curvature and axial and lateral color are highly corrected throughout both the range of focus and the zooming range.

A preferred example of the zoom lens having a magnification range of about two to one is constructed in conformity with the following table wherein dimensions are in terms of inches and the refractive indices for the sodium D line and the Abbe dispersion numbers are respectively designated at $n_d$ and V:

[E.F.L.=.788 (Fig. 1) telephoto; .5516 (Fig. 2) median; .3991 (Fig. 3) wide angle, $f/1.9$. B.F.L.=.382]

| | | | | |
|---|---|---|---|---|
| $L_1$ | $R_1 = +2.004$ | $t_1 = .090$ | $n_d = 1.689$ | $V = 30.9$ |
| | $R_2 = +1.000$ | | | |
| $L_2$ | | $t_2 = .250$ | $n_d = 1.617$ | $V = 55.0$ |
| | $R_3 = -12.853$ | | | |
| | | $s_1 = \begin{cases} .890 \text{ (Fig. 1) Telephoto} \\ .550 \text{ (Fig. 2) Median} \\ .094 \text{ (Fig. 3) Wide Angle} \end{cases}$ | | |
| | $R_4 = +2.737$ | | | |
| $L_3$ | | $t_3 = .070$ | $n_d = 1.611$ | $V = 58.8$ |
| | $R_5 = +.891$ | | | |
| | | $s_2 = .110$ | | |
| | $R_6 = -1.379$ | | | |
| $L_4$ | | $t_4 = .070$ | $n_d = 1.611$ | $V = 58.8$ |
| | $R_7 = +1.000$ | | | |
| $L_5$ | | $t_5 = .120$ | $n_d = 1.720$ | $V = 29.3$ |
| | $R_8 = +12.231$ | | | |
| | | $s_3 = \begin{cases} .1245 \text{ (Fig. 1) Telephoto} \\ .622 \text{ (Fig. 2) Median} \\ .9565 \text{ (Fig. 3) Wide Angle} \end{cases}$ | | |
| | $R_9 = +31.920$ | | | |
| $L_6$ | | $t_6 = .060$ | $n_d = 1.689$ | $V = 30.9$ |
| | $R_{10} = +1.818$ | | | |
| $L_7$ | | $t_7 = .060$ | $n_d = 1.611$ | $V = 58.8$ |
| | $R_{11} = -1.818$ | | | |
| | | $s_4 = .005$ | | |
| | $R_{12} = +.360$ | | | |
| $L_8$ | | $t_8 = .116$ | $n_d = 1.700$ | $V = 47.8$ |
| | $R_{13} = $ Plano | | | |
| | | $s_5 = .036$ | | |
| | $R_{14} = -.414$ | | | |
| $L_9$ | | $t_9 = .042$ | $n_d = 1.7506$ | $V = 27.7$ |
| | $R_{15} = +.470$ | | | |
| | | $s_6 = .036$ | | |
| | $R_{16} = -1.059$ | | | |
| $L_{10}$ | | $t_{10} = .097$ | $n_d = 1.651$ | $V = 55.8$ |
| | $R_{17} = -.344$ | | | |
| | | $s_7 = .007$ | | |
| | $R_{18} = +.7135$ | | | |
| $L_{11}$ | | $t_{11} = .111$ | $n_d = 1.651$ | $V = 55.8$ |
| | $R_{19} = -.787$ | | | |

While in the above example, the front member 1 is moved non-linearly for focus compensation during zooming, it is also contemplated to have the front member 1 stationary during zooming and achieving the focus compensation during zooming by moving the lenses $L_6$—$L_7$ non-linearly, the stop 5 of course being located at a different position. The front member 1 preferably would still be adjustable for focusing purposes but not during zooming operations.

While the invention is thus described, it is not wished to be limited to the precise details described, as changes may be readily made without departing from the spirit of the invention.

What is claimed is:

A zoom lens, proceeding from front to rear, a positive biconvex doublet front component, a negative zooming member, a positive meniscus doublet third component concave to the front, and a prime lens, and being further characterized in that the zoom lens conforms substantially to the following table in which dimensions are in terms of inches, and, proceeding from front to rear, $L_1$ to $L_{11}$ designate the lenses, $R_1$ to $R_{19}$ the radii of curvature of the surfaces, $t_1$ to $t_{11}$ the axial thicknesses, $s_1$ to $s_8$ the axial separations, $n_d$ the indices of refraction for the sodium D line and V the Abbe dispersion numbers:

| Lens | R | t, s | $n_d$ | V |
|---|---|---|---|---|
| $L_1$ | $R_1 = +2.004$ | $t_1 = .090$ | $n_d = 1.689$ | $V = 30.9$ |
|  | $R_2 = +1.000$ |  |  |  |
| $L_2$ |  | $t_2 = .250$ | $n_d = 1.617$ | $V = 55.0$ |
|  | $R_3 = -12.853$ |  |  |  |
|  |  | $s_1 = \begin{cases} .890 \text{ (Fig. 1) Telephoto} \\ .550 \text{ (Fig. 2) Median} \\ .094 \text{ (Fig. 3) Wide Angle} \end{cases}$ |  |  |
|  | $R_4 = +2.737$ |  |  |  |
| $L_3$ |  | $t_3 = .070$ | $n_d = 1.611$ | $V = 58.8$ |
|  | $R_5 = +.891$ |  |  |  |
|  |  | $s_2 = .110$ |  |  |
|  | $R_6 = -1.379$ |  |  |  |
| $L_4$ |  | $t_4 = .070$ | $n_d = 1.611$ | $V = 58.8$ |
|  | $R_7 = +1.000$ |  |  |  |
| $L_5$ |  | $t_5 = .120$ | $n_d = 1.720$ | $V = 29.3$ |
|  | $R_8 = +12.231$ |  |  |  |
|  |  | $s_3 = \begin{cases} .1245 \text{ (Fig. 1) Telephoto} \\ .622 \text{ (Fig. 2) Median} \\ .9565 \text{ (Fig. 3) Wide Angle} \end{cases}$ |  |  |
|  | $R_9 = +31.920$ |  |  |  |
| $L_6$ |  | $t_6 = .060$ | $n_d = 1.689$ | $V = 30.9$ |
|  | $R_{10} = +1.818$ |  |  |  |
| $L_7$ |  | $t_7 = .060$ | $n_d = 1.611$ | $V = 58.8$ |
|  | $R_{11} = -1.818$ |  |  |  |
|  |  | $s_4 = .005$ |  |  |
|  | $R_{12} = +.360$ |  |  |  |
| $L_8$ |  | $t_8 = .116$ | $n_d = 1.700$ | $V = 47.8$ |
|  | $R_{13} = $ Plano |  |  |  |
|  |  | $s_5 = .036$ |  |  |
|  | $R_{14} = -.414$ |  |  |  |
| $L_9$ |  | $t_9 = .042$ | $n_d = 1.7506$ | $V = 27.7$ |
|  | $R_{15} = +.470$ |  |  |  |
|  |  | $s_6 = .036$ |  |  |
|  | $R_{16} = -1.059$ |  |  |  |
| $L_{10}$ |  | $t_{10} = .097$ | $n_d = 1.651$ | $V = 55.8$ |
|  | $R_{17} = -.344$ |  |  |  |
|  |  | $s_7 = .007$ |  |  |
|  | $R_{18} = +.7135$ |  |  |  |
| $L_{11}$ |  | $t_{11} = .111$ | $n_d = 1.651$ | $V = 55.8$ |
|  | $R_{19} = -.787$ |  |  |  |

No references cited.